(12) United States Patent
Schwab et al.

(10) Patent No.: US 8,528,572 B2
(45) Date of Patent: Sep. 10, 2013

(54) PART OF A COSMETIC UNIT

(75) Inventors: Friedrich Schwab, Sachsen (DE); Dieter Wolfsgruber, Burgoberach (DE)

(73) Assignee: Geka GmbH, Bechhofen (DE)

( * ) Notice: Subject to any disclaimer, the term of this patent is extended or adjusted under 35 U.S.C. 154(b) by 444 days.

(21) Appl. No.: 12/675,868

(22) PCT Filed: Aug. 28, 2008

(86) PCT No.: PCT/EP2008/007052
§ 371 (c)(1),
(2), (4) Date: Mar. 1, 2010

(87) PCT Pub. No.: WO2009/030426
PCT Pub. Date: Mar. 12, 2009

(65) Prior Publication Data
US 2010/0307529 A1    Dec. 9, 2010

(30) Foreign Application Priority Data
Aug. 31, 2007    (EP) .................................... 07017046

(51) Int. Cl.
*A45D 40/26* (2006.01)
*A45D 33/00* (2006.01)
*A46B 11/00* (2006.01)

(52) U.S. Cl.
USPC .............................. 132/218; 401/130; 401/129

(58) Field of Classification Search
USPC ................. 132/218, 320; 401/122, 129, 126, 401/124, 118; 300/21
See application file for complete search history.

(56) References Cited

U.S. PATENT DOCUMENTS

| | | | |
|---|---|---|---|
| 3,469,928 A * | 9/1969 | Widegren | 401/122 |
| 3,752,351 A | 8/1973 | Nagata | |
| 4,194,848 A * | 3/1980 | Kingsford | 401/5 |
| 4,535,901 A * | 8/1985 | Okudaira et al. | 215/12.2 |
| 4,646,925 A * | 3/1987 | Nohara | 428/542.8 |
| 5,190,389 A * | 3/1993 | Vasas | 401/122 |
| 6,521,159 B1 * | 2/2003 | Rashid et al. | 264/255 |
| 6,616,366 B1 | 9/2003 | Weihrauch | |
| 6,702,494 B2 | 3/2004 | Dumler | |
| 7,874,300 B2 * | 1/2011 | Roeder | 132/320 |
| 2005/0034740 A1 * | 2/2005 | Eckers et al. | 132/218 |
| 2007/0033760 A1 | 2/2007 | Dumler | |
| 2008/0011778 A1 * | 1/2008 | Ronsin et al. | 222/94 |
| 2008/0219747 A1 * | 9/2008 | Vanoncini | 401/122 |
| 2008/0286030 A1 * | 11/2008 | Roder | 401/129 |
| 2009/0214284 A1 | 8/2009 | Gueret | |

FOREIGN PATENT DOCUMENTS

| | | |
|---|---|---|
| EP | 1161159 B1 | 12/2001 |
| EP | 1348352 B1 | 11/2005 |
| EP | 1752063 A1 | 2/2007 |
| EP | 1935279 A1 | 6/2008 |
| GB | 2061709 A | 5/1981 |
| WO | 0054623 A1 | 9/2000 |
| WO | 2006013408 A1 | 2/2006 |
| WO | 2006059046 A2 | 6/2006 |
| WO | 2008069354 A1 | 6/2008 |

* cited by examiner

*Primary Examiner* — Robyn Doan
(74) *Attorney, Agent, or Firm* — Browdy and Neimark, PLLC

(57) ABSTRACT

The part of a cosmetics unit is an applicator in the form of a brush (1). It is implemented as a sandwich injection-molded part consisting of two different plastic components (9a, 11a). A first inner plastic component (11a) is injected by means of a single joint injection point (14) into a second outer plastic component (9a). The first inner plastic component (11a) and the second outer plastic component (9a) precisely rest against each other everywhere with regard to their contours. A connecting area is formed, so as to be free of gaps everywhere, between the first inner plastic component (11a) and the second outer plastic component (9a). The second outer plastic component (9a) completely encloses the first inner plastic component (11a), with the exception of the injection point (14). The sandwich injection-molded part (1) has a total weight of at most 10 g.

11 Claims, 5 Drawing Sheets

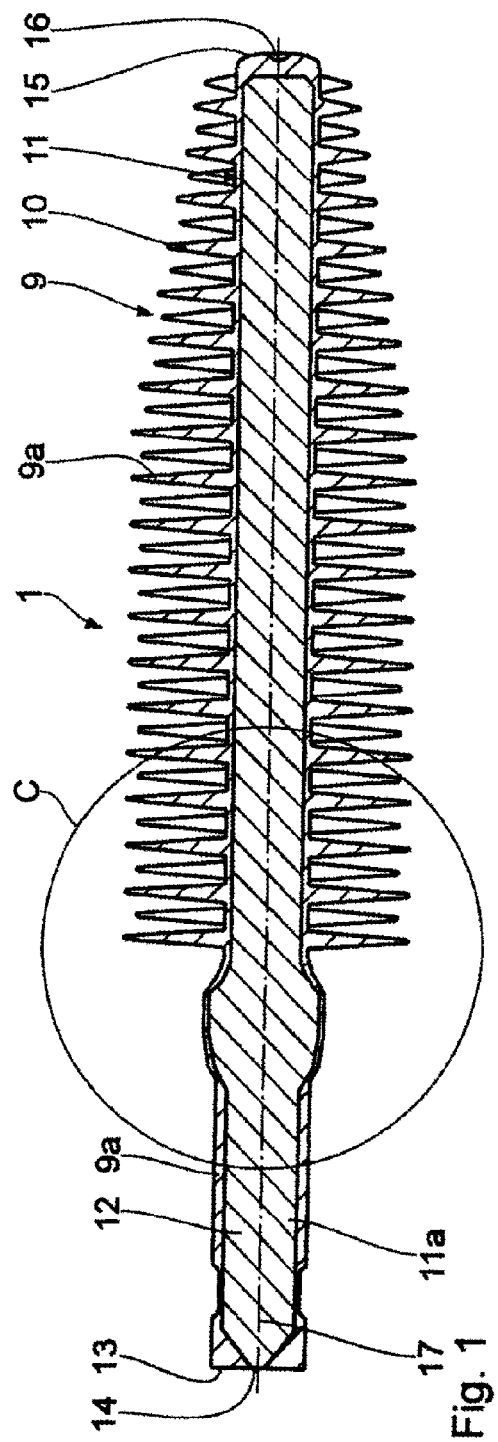
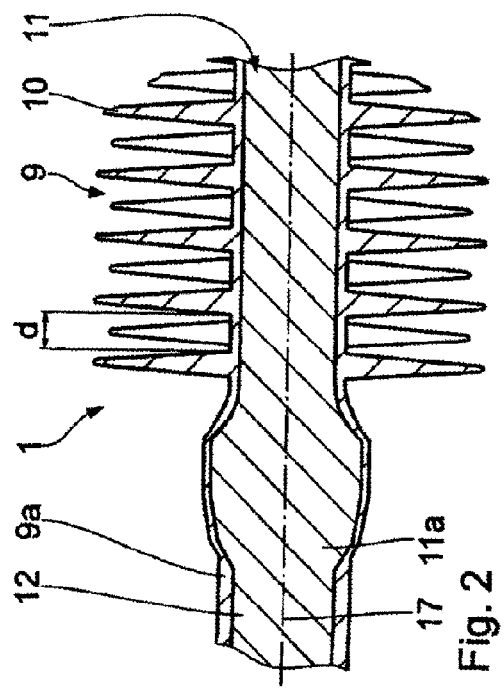

PART OF A COSMETIC UNIT

FIELD

The invention is directed to a part of a cosmetics unit, in particular an applicator, preferably a brush, a container, a closure cap or a wiper, consisting two different plastic components. Apart from brushes, applicators may also be those for lip and eye cosmetics.

BACKGROUND

It is known, for example from EP 1 161 159 B1, to manufacture cosmetics units from plastics by injection molding. In the case of these brushes produced with the so-called two-component injection molding process, a rugged core is injection-molded from a relatively hard plastic, and a bristle body is injection-molded from a relatively soft plastic over this core. In order to fix the bristle body axially relative to the hard core, it is known, for example, to provide undercuts on the core or to attach fixing caps or the like on the ends. A brush with a similar structure is also described in EP 1 752 063 A1.

What is characteristic with regard to these known products is that the geometry of the first material is enclosed only partially or in certain portions by the second or even third material, and that two or three injection points are provided at different locations, depending on the number of different materials. Usually, the number of mold cavities in this case depends on the number of materials and on the geometries to be molded with the different materials. If, for example, an eight-cavity mold is designed for a two-component lip applicator, then eight mold cavities are required for the first material component and geometry, and eight further cavities are required for the second material component and geometry.

This entails various drawbacks with regard to the finished products, such as, for example, more than one injection point, as well as impressions of mold separations and ejector geometries which have disadvantageous effects with regard to the application function and/or visual aspects.

SUMMARY

Against this background, the invention is based on the object of producing a part of a cosmetics unit of the kind mentioned in the introduction, in particular a brush, by means of a two-component injection molding process and configuring it so as to obtain additional advantages through the conditions conventionally resulting from the different material properties of the two components in such a process.

According to the invention, the object is achieved by a part of the cosmetics unit in accordance with the features of the main claim. The part according to the invention of a cosmetics unit is a sandwich injection-molded part in which a first inner plastic component is injected by means of a single joint injection point into a second outer plastic component. Thus, the first inner plastic component and the second outer plastic component rest precisely against each another everywhere with regard to their contour, that is, in particular over the entire boundary surface between the two plastic components, and a connecting area between the first inner plastic component and the second outer plastic component is formed free of gaps everywhere. Moreover, the second outer plastic component encloses the first inner plastic component substantially, i.e. with the exception, at most, of the injection point, completely. Furthermore, the sandwich injection-molded part has a total weight of at most 10 g (grams).

If the phrase "substantially" completely enclosed is used in the above, this primarily means that in the area of an injection point, the inner plastic component is possibly accessible from the outside to a small degree unless, as is described below, use is made of a specific cover in a further process step.

If two material components are mentioned here and below, this must be understood to mean that at least two components are being processed, but that of course a third or further components can be used, for example.

Preferably, the production of such a part according to the invention is carried out by means of a special injection-molding process which alternately controls precisely the exact injection times of the two plastic components through one and the same cutout in the mold, in particular the dosing quantity, injection time and injection duration.

Into an outer plastic component, a core of another inner plastic component is introduced in such a sandwich injection molding process. To this end, process control runs in two or three stages. First, the cavity of the injection mold is partially filled with the material of the outer shell, that is, with the outer plastic component, and then the core component (=inner plastic component) is injected through the still-malleable center of the material (=outer plastic component) already introduced. In the process, both plastic components are injected through the same nozzle. Accordingly, there is only a single joint injection point on the produced part for both plastic components.

At this injection point, a closure can be produced in the sprue or injection area with the material of the outer plastic component at the end, in the optional third processing step. This prevents the core material, that is, the inner plastic component, from remaining visible and/or accessible on the surface of the produced part. At the same time, the sprue or injection system is cleaned for the next shot.

In a part of a cosmetics unit thus produced, in particular a brush, for example a mascara brush or hair-dyeing brush, the advantages known per se of a soft outer component and of a rugged inner core are being achieved, beyond this, however, an absolutely reliable axial fixing is being obtained, without special constructional changes or additional production steps being required therefor.

Because of the different plastic-components provided, a very advantageous uncoupling of functions can be achieved, and thus, an improved design of the respective part of the cosmetics unit. Thus, the outer plastic component is selected, for example, in accordance with the desired surface properties, such as scratch resistance, feel and/or visual appearance. In contrast, the inner plastic component can be selected with a view to totally different properties, such as, for example, with respect to the mechanical ruggedness of the sandwich injection-molded part.

The transition between the two plastic components is always homogeneously sealed, in particular over the entire boundary surface formed between the two plastic components. There is a homogeneously sealed bond between the two plastic components. The bond is absolutely free of gaps. Even in high-resolution cross-section images, no gaps or open pores are evident at the boundary between the two plastic components. This applies down to the μm range. Thus, no gaps or pores in the order of magnitude of a few μm up to 10 μm can be found.

An essential aspect of the invention lies in the realization that the plastic parts with a total weight of less than 10 g, and in particular even less than 5 g, can be carried out as sandwich injection-molded parts.

According to a beneficial embodiment, the two plastic components each have a hardness in the range of between Shore A 40 and Shore D 95. In a sandwich injection-molded part configured as a brush, this applies both to the outer bristle material as well as to the inner core material.

According to another beneficial embodiment, the second outer plastic component is softer than the first inner plastic component. In the sandwich injection-molded parts according to the invention of a cosmetics unit, a soft outer component is advantageous because of its resilience, because in that case, a larger oversize can be utilized, which is advantageous in particular if the aim is to bring two elements into engagement with each other. Moreover, a simplification of the assembly is thereby achieved. A soft outer plastic component also has an advantageous effect with regard to the different possible assembly geometries.

According to another beneficial embodiment, the second outer component is transparent or translucent. Special optical effects and primarily a particularly attractive outward appearance can thus be achieved. If necessary, barrier materials may also be added to at least one of the two plastic components. Moreover, the outer plastic component can also be selected such that a subsequent decoration, e.g. in the form of hot-foil embossing or by means of screen printing and a possible coating is supported, e.g. by using transparent ABS (=acrylonitrile butadiene styrene).

According to another beneficial embodiment, the second outer plastic component has a lower friction coefficient than the first inner plastic component. A sandwich injection-molded part thus designed can be moved relative to another element particularly well and without additional aids. In particular, a very smooth screw connection between two elements can be realized.

Advantageously, it may also be provided that, in the case of a brush, the injection point is located in the area of an end face of a core of the brush or laterally of the base of the stem of the brush, and/or that the ejector for ejecting an injection-molded brush from the injection mold acts at an end face of the core or of a base of the stem.

It is possible in this manner to injection-mold extremely delicate brushes for cosmetic purposes with a plurality of very fine bristles without the bristle covering being interrupted by an injection point or damaged by an ejector.

If such a brush, in extension of the bristle covering, comprises, in a manner known per se, a base of a stem formed by an extension of the core, it is provided, according to the invention, to overmold also this base of the stem with the outer plastic component. In a different variant of the brush according to the invention, it may also be provided that the brush body entirely consists of the outer plastic component, and that only a base of the stem enclosed therewith consists of a harder plastic component. In any case, the base of the stem consists in part of the first plastic component and in part of the second plastic component.

The embodiment according to the invention is not limited to certain brushes, but is particularly suitable for slender or delicately structured brushes, it being extremely surprising that it is possible at all to carry out the sandwich procedure in the case of such brushes.

Brushes with up to 2,000 bristles per covering are preferred, with the bristles advantageously tapering conically towards the free end and comprising at the base a circumference having a radius of 0.15 mm to 1.0 mm. The length of the bristles can be between 0.5 mm and 8.0 mm and the tips can be rounded, e.g. with a radius of 0.025 mm to 0.40 mm.

If the bristles have a non-circular cross section at the base, it is provided that they also taper towards the tip while maintaining the cross section. Alternatively, it may also be provided that the cross section changes towards the tip.

The mutual distance between the bristles (=distance of the bristles between adjacent bristles) can be between 0.1 mm to 2.0 mm.

Moreover, it is possible that the bristles are disposed offset to one another in the axial direction and/or in the circumferential direction, with the axial direction and the circumferential direction relating in each case to a central longitudinal axis of the brush. In particular, the base areas of adjacent bristles, as viewed in the axial direction and/or circumferential direction, can overlap or be spaced from one another by a small base distance of 4.5 mm at most, in particular 2.0 mm at most, and preferably of 0.5 mm at most in the axial direction, and/or by 90° at most, in particular 100° at most, and preferably 2.5° at most in the circumferential direction. This results in a very high structuring density, which nevertheless can be produced by means of the sandwich technology.

If the sandwich injection-molded part is configured as a wiper for the applicator of a cosmetics unit, e.g. a mascara unit, it can advantageously be provided that the outer plastic component is softer than the inner plastic component. The softer outer plastic component is in that case preferably disposed within the sealing area. There, it serves for increasing the sealing effect between a container into which the wiper is inserted, and a closure cap. A molded-on sealing disc having an axial thickness of between 0.6 mm and 3.0 mm can be formed on an axial end face of the wiper. It thus becomes possible to close the container without a safety gap in a leak-tight manner with the closure cap.

Additionally or alternatively, a wiper lip can also be formed by the softer outer plastic component.

If the sandwich injection-molded part is formed as a container, it can advantageously be provided that the outer plastic component has a friction-decreasing effect, as it is known, for example, in the case of teflon, and that, in particular, it has a lower friction coefficient than the inner plastic component. It is beneficial if this friction-decreasing outer plastic component is also disposed within a threaded area of the container in order to form a smooth threaded connection there, e.g. with a closure cap. Accordingly, a corresponding threaded area of a closure cap also formed as a two-component sandwich injection-molded part can preferably also consist of a similarly friction-decreasing outer plastic component.

Generally, by selecting the outer plastic component appropriately, a certain surface function, such as visual transparency, translucency, a frosted-glass-like appearance, a coloration or a certain reflectance, such as an especially high or especially low reflection, can be accurately determined. With regard to the haptic properties, the surface may be formed to feel soft, smooth, warm or cold. With respect to mechanical properties, the surface can be formed to be scratch-proof, to have a non-stick coating, or to have a particularly good wettability.

In the container formed as a sandwich injection-molded part, the outer plastic component in the finished state can, in particular, be transparent, translucent or colored in order to obtain a pleasant visual effect. Moreover, barrier materials can also be used.

BRIEF DESCRIPTION OF THE DRAWINGS

The invention is explained in more detail with reference to exemplary embodiments of the parts of a cosmetics unit in conjunction with the drawing. In the figures:

FIG. 1: shows a longitudinal section through a first embodiment of a mascara brush of a mascara unit, FIG. 2: shows an enlarged view of the detail C included in FIG. 1, FIG. 3: shows a longitudinal-section view of a second exemplary embodiment of the mascara brush.

DETAILED DESCRIPTION

Figure 3:
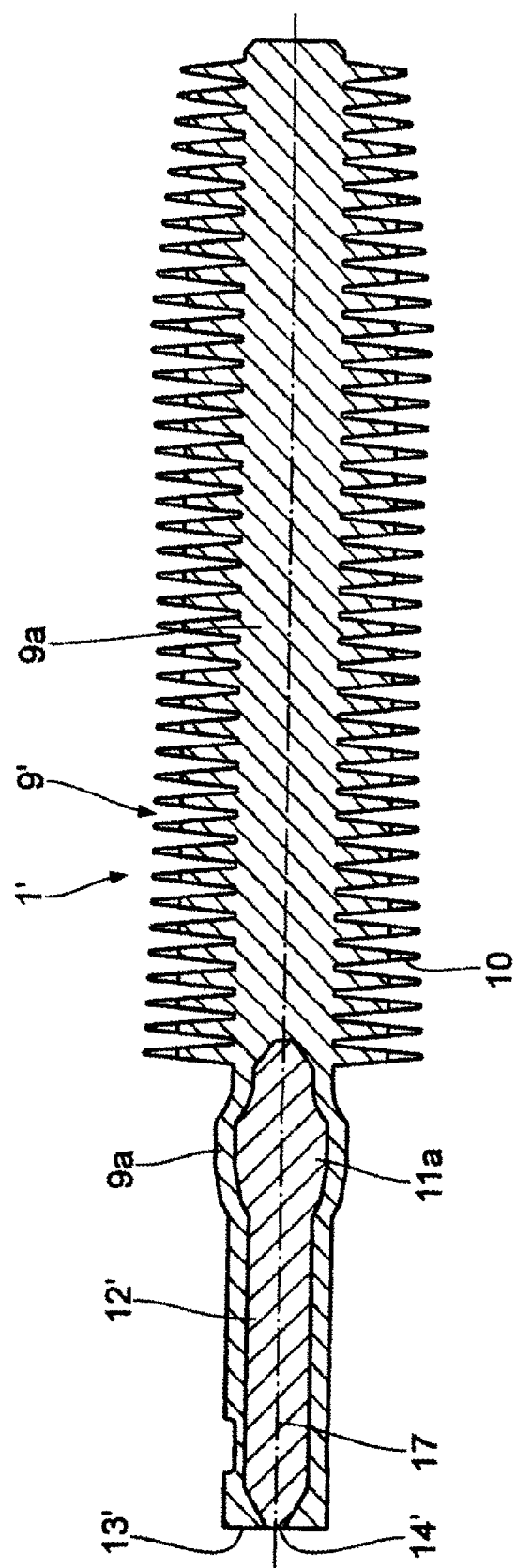

The parts of a cosmetics unit shown in the drawing, in particular of a mascara unit, can all be manufactured by means of the two-component sandwich process. Thus, they are sandwich injection-molded parts in each case. Basically, however, this advantageous manufacturing process does not have to be used in the case of all parts of the mascara unit. Particularly advantageously, it can be used in the mascara brushes 1 and 1', respectively, shown in the FIGS. 1 to 3.

Parts of other cosmetics units not shown can also be fabricated by means of the advantageous two-component sandwich process.

In a complete cosmetics unit, a mascara brush 1 (see FIGS. 1 and 2) is attached to a stem 2 of a closure or screw-on cap 3 (see FIG. 6) with an internal thread 4, which can be screwed onto an external thread 5 of a container 6 (see FIG. 4), with a wiper means 7 (FIG. 5) being inserted into a neck 8 of the container 6.

In the exemplary embodiment of a mascara brush 1 shown in FIG. 1, a bristle covering 9 is formed by a plurality of bristles 10 and consists of a softer outer plastic component 9a enclosing a core 11 of a harder inner plastic component 11a. The core 11, in the area beyond the covering 9, comprises a base 12 of the stem which is integral therewith, with a single joint injection point 14 being provided at a left axial end face 13, as seen in the drawing, of the core 11 or the base 12 of the stem.

By means of this injection point 14, the softer outer plastic component 9a has at first been injected into an injection mold not shown, and then the harder inner plastic component 11a has been injected into the softer outer plastic component 9a, which has not yet hardened. The result is an intimate and, in particular, gap-free bond between the two plastic components 9a and 11a. In a connecting area, the two plastic components 9a and 11a are matched to each other precisely with regard to their contours, with this high degree of agreement in the geometries of the contour or of the boundary surfaces advantageously being the automatic effect of the two-component sandwich process. The connection thus obtained, which is also a positive fit connection, between the plastic components 9a and 11a is particularly solid and permanently rugged, without additional safeguards being required.

A point of action 16, at which an ejector that is not shown in more detail acts upon completion of the injection-molding process in order to eject the finished injection-molded and hardened brush 1 from the mold, is provided at the other end face 15.

As becomes clear, in particular from FIG. 2, the bristles 10 taper conically towards the free end. The bristles 10 are close to one another. In the axial direction, i.e. in the direction of a central longitudinal axis 17, there is a distance d of just 0.20 mm between the base areas of adjacent bristles. Despite this very fine structure, the two-component sandwich process provided according to the invention can be employed.

It is apparent from FIG. 1 that the softer outer plastic component 9a, of which the bristles 10 also consist, substantially completely encloses the inner harder plastic component 11a of the core 11 and of the base 12 of the stem, with the exception of a small gap at the injection point 14.

A different exemplary embodiment of a brush 1' is shown in FIG. 3, which differs from the brush 1 according to FIG. 1 by the fact that the core area of the covering 9' consists of the same material as the bristles 10, i.e. also of the softer plastic component 9a. Only the base 12' of the stem also comprises the harder plastic component 11a, which is completely encased by the outer softer component 9a with the exception of the injection point 14'.

The ejector in this exemplary embodiment preferably acts on the rear end face 13' of the base 12' of the stem, in the area of the injection point 14'.

Figure 4:
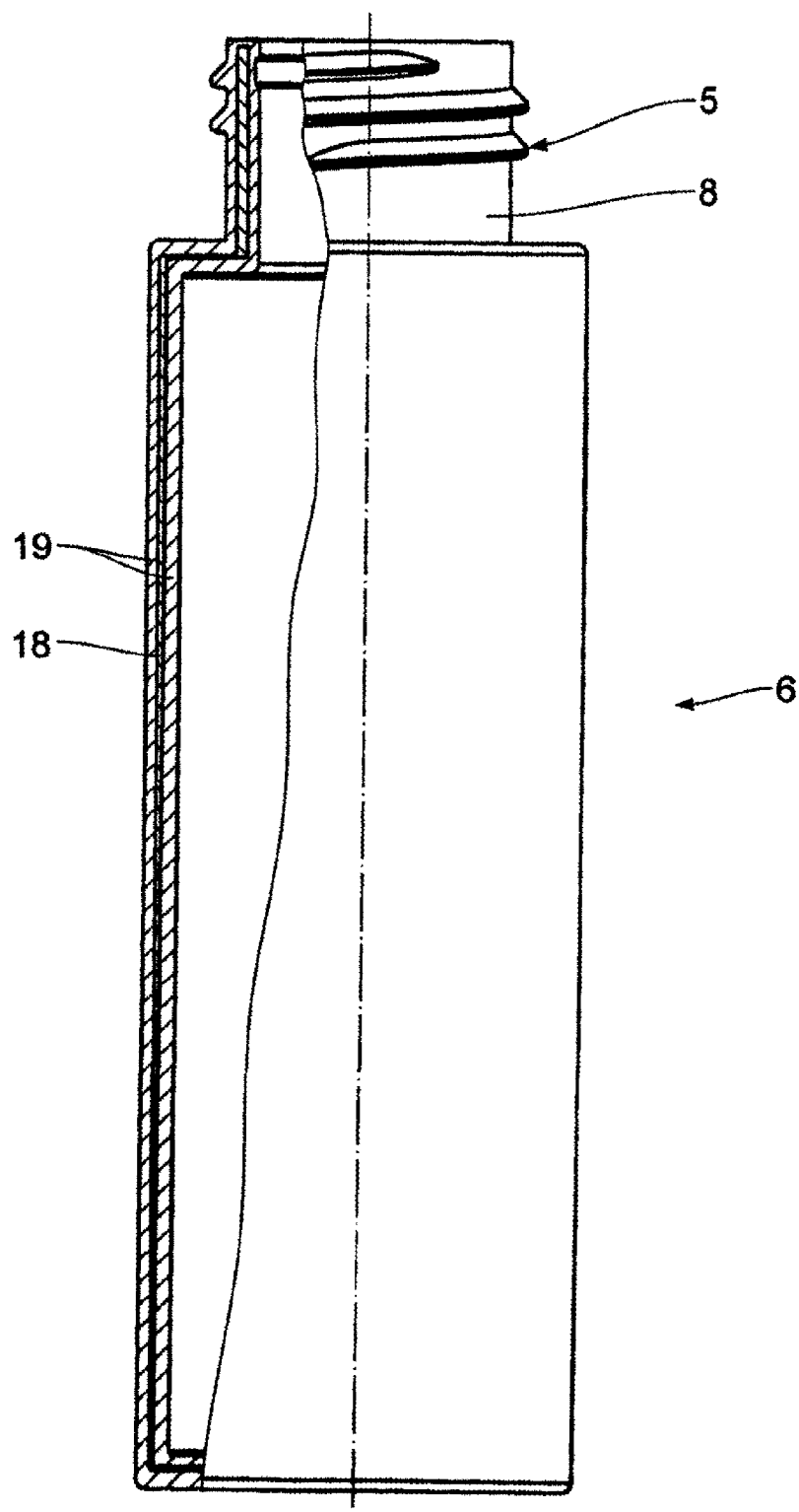
FIG. 4: shows a partial cutaway view of an exemplary embodiment of a container of a mascara unit.

The container 6 shown in FIG. 4 comprises two plastic components, i.e. an inner load-bearing plastic component 18 which is completely encased by a second plastic component 19 both on the inside as well as on the outside.

Figure 5:
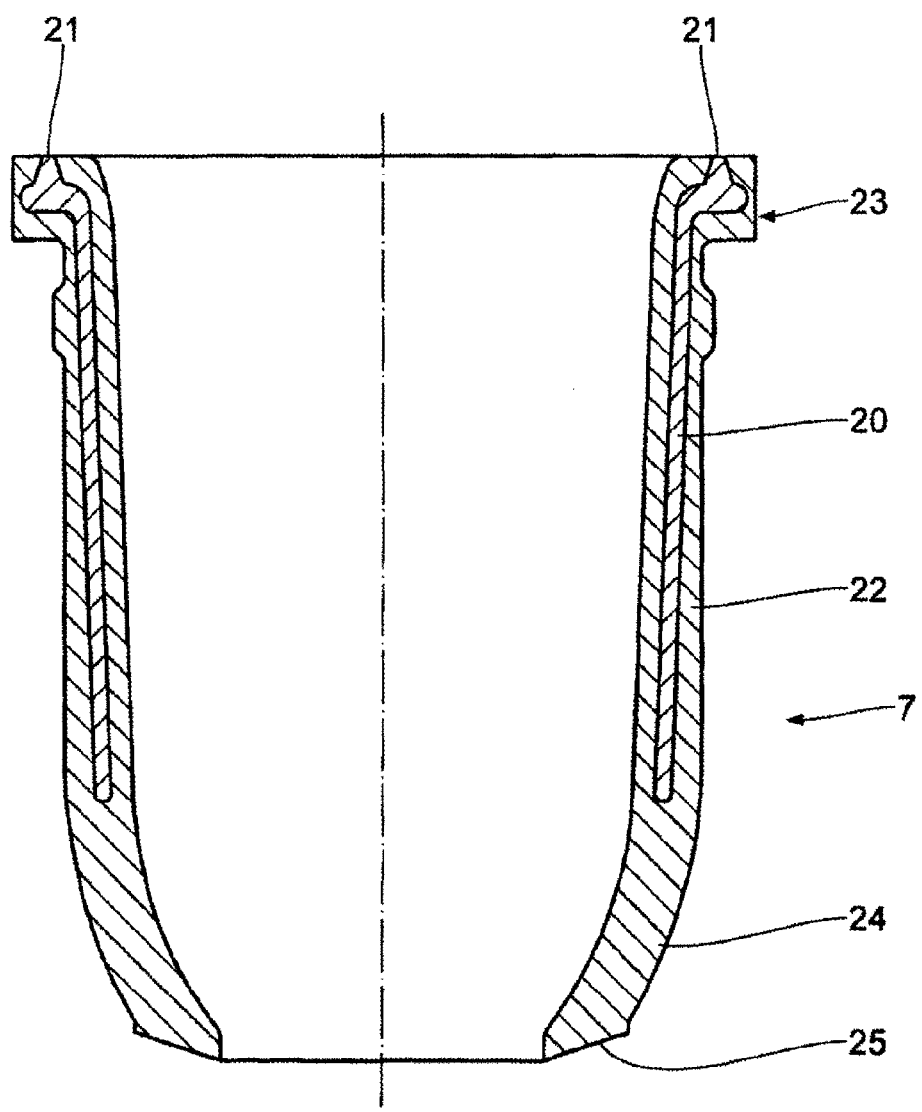
FIG. 5: shows a longitudinal section through an exemplary embodiment of a wiper means of a mascara unit.

A wiper 7 shown in FIG. 5 has an inner, harder load-bearing plastic component 20 which is encased entirely by a soft plastic component 22, with the exception of the injection points (or the injection ring) 21.

The softer plastic component 22 is particularly advantageous in the sealing area 23 and in the area of the wiper lips 24. The ejector acts on the free frontal end 25 of the wiper lips 24.

Figure 6:
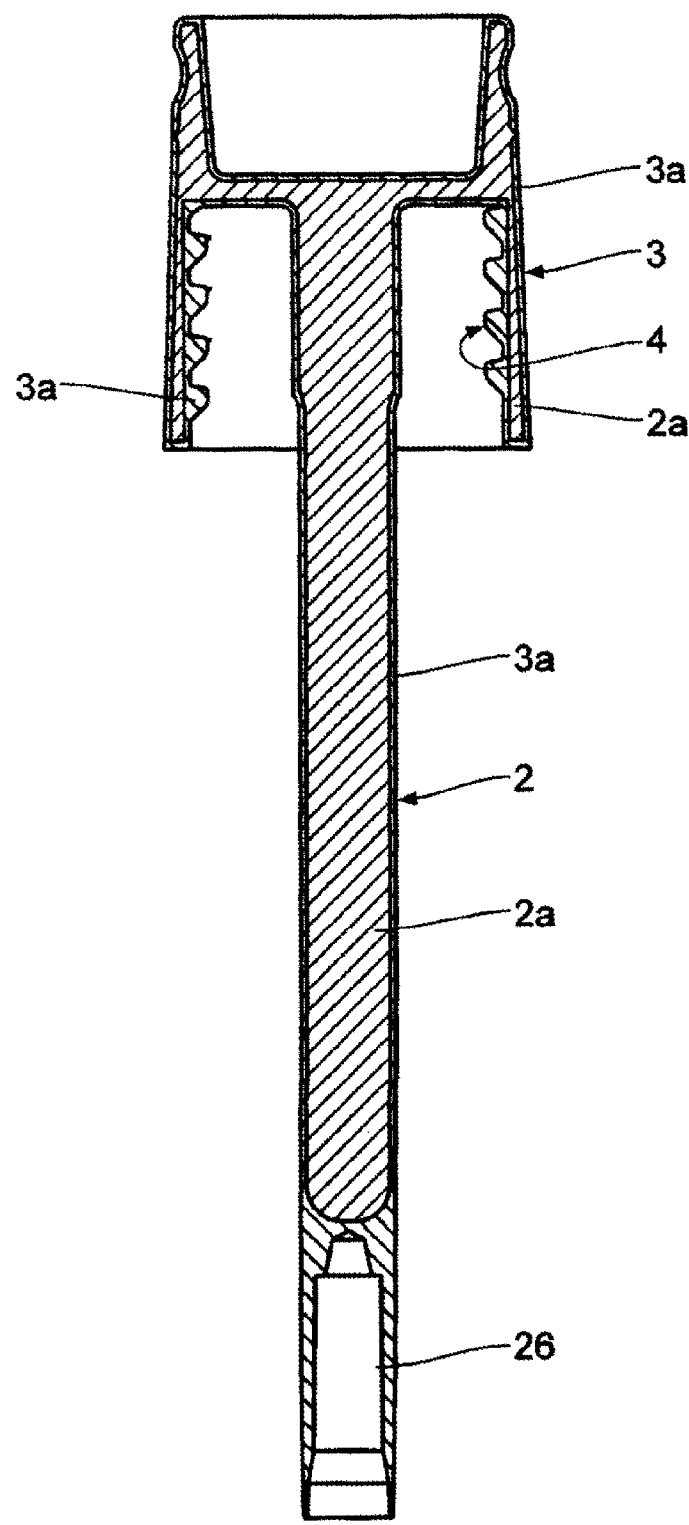
FIG. 6: shows a longitudinal section through an exemplary embodiment of a closure unit of a mascara unit comprising a stem.

FIG. 6 shows a closure unit consisting of a stem 2 with a recess 26 for attaching an applicator, e.g. one of the mascara brushes 1 and 1', to the upper end of which a closure or screw-on cap 3 with an internal thread 4 is molded integrally.

The interior of the stem 2 and the screw-on cap 3 is formed by a harder plastic component 2a completely encased by a softer plastic component 3a, which decreases friction in the area of the internal thread 4 and furthermore facilitates the engagement of the applicator into the recess 26.

In addition to the embodiments concretely described above in the drawing, numerous other advantageous embodiments of parts of various cosmetics units that are in each case formed as sandwich injection-molded parts are also conceivable.

For example, a so-called "duo cosmetics unit" is known from EP 1 348 352 B1, in which two different applicators are disposed on both sides of a central sleeve. This sleeve may also be advantageously configured as a sandwich injection-molded part, comprising a harder, more rigid inner material component and an outer material component that makes a desired feel possible, which may, for example, provide scratch resistance, and which can be visually transparent, translucent or colored. Preferably, the injection point in this case lies in the area of the intermediate wall of the sleeve in the form of a pin-point gate, a ring gate or of a needle shut-off gate. In the finished state, the harder material component, in the area of the injection point, can be covered completely by the second component, or also protrude openly. Preferably, the ejector acts on the end face.

Moreover, the slip-on caps placed on both sides of the connecting sleeve, which cover the applicators, can be designed in accordance with the invention. In this case, the injection point can also be located on the inside of the cap bottom, and the second component, in turn, can be transparent, translucent or colored.

Another example is a brush with brushes which are non-circular in cross section and taper in the direction of the tip. In this case, it may also be provided that the cross section changes towards the tip.

The technology according to the invention can advantageously be used in applicators that have an appearance of a plurality of discs being lined up one next to the other.

What is surprising is that with the technology described, sandwich injection-molded parts with an individual weight of 0.1 to 10 g can be produced even though the combined dosing volume of the two plastic components can lie between 4 cm$^3$ and 80 cm$^3$, despite this low weight of the parts. The weight fractions of the individual plastic components can vary widely, e.g. in a range of 5 to 95%. The weight of the brush 1 or 1', just as that of the wiper 7, can lie in the range of between 0.1 g and 0.8 g, that of the closure unit with the closure or screw-on cap 3 can lie in the range of between 1.2 g and 8.0 g, and that of the container 6 in the range of between 2.0 g and 10.0 g.

The invention claimed is:

1. Part of a cosmetics unit formed as a sandwich injection-molded part consisting of two different plastic components, comprising:
    a first inner plastic component,
    a second outer plastic component having a single joint injection opening through which the first inner plastic component protrudes, wherein an outer surface of the first inner plastic component and an inner surface of the second outer plastic component rest against one another so as to be free of gaps between the first inner plastic component and the second outer plastic component, and
    wherein the first inner plastic component is disposed substantially completely inside the second outer plastic component except that the first inner plastic component is uncovered only at the single joint injection opening, and
    wherein a homogeneously sealed and intimate bond and a positive-fit connection which is permanently rugged without additional safeguards is formed between the first inner plastic component and the second plastic component,
    wherein the sandwich injection-molded part has a total weight of at most 10 g, and
    wherein the sandwich injection-molded part is formed as a brush and that the injection point is provided in the area of an end face of a core of the brush or laterally on a base of the stem of the brush.

2. Part of a cosmetics unit according to claim 1, wherein the two plastic components each have a hardness that lies in the range of between Shore A 40 and Shore D 95.

3. Part of a cosmetics unit according to claim 1, wherein the second outer plastic component is softer than the first inner plastic component.

4. Part of a cosmetics unit according to claim 1, wherein the second outer component is transparent or translucent.

5. Part of a cosmetics unit according to claim 1, wherein the second outer plastic component has a lower friction coefficient than the first inner plastic component.

6. Part of a cosmetics unit according to claim 1, wherein a point of action of an ejector for ejecting the injection-molded brush from an injection mold lies at the end face of the core or at the base of the stem.

7. Part of a cosmetics unit according to claim 1, wherein the base of the stem of the brush also partially consists of the first plastic component and is enclosed by the second plastic component.

8. Part of a cosmetics unit according to claim 1, wherein the brush has a bristle covering with up to 2,000 bristles, wherein a bristle distance between adjacent bristles is in particular between 0.1 mm and 2.0 mm.

9. Part of a cosmetics unit according to claim 8, wherein the brush has a central longitudinal axis and that base areas of adjacent bristles, as viewed in the, relative to the central longitudinal axis, axial direction and/or circumferential direction, overlap, or that they are spaced from one another by a small base distance (d) of 4.5 mm at most in the axial direction, and/or by 90° at most in the circumferential direction.

10. Part of a cosmetics unit according to claim 1, wherein the cosmetic unit is one of an applicator, a brush, container, closure cap or wiper.

11. A method of making a part of a cosmetics unit formed as a sandwich injection-molded part consisting of two different plastic components, comprising
    injecting a first inner plastic component through a single joint injection opening defined in a second outer plastic component, so that
        the first inner plastic component and the second outer plastic component precisely rest against each other precisely everywhere with regard to their contours,
        a connecting area is formed between the first inner plastic component and the second outer plastic component so as to be free of gaps everywhere, and
        the second outer plastic component completely encloses the first inner plastic component, with the exception, at most, of the injection opening, and
        a homogeneously sealed and intimate bond and a positive-fit connection which is permanently rugged without additional safeguards is formed between the first inner plastic component and the second plastic component, and
    forming the sandwich injection-molded part to have a total weight of at most 10 g,
    forming the sandwich injection-molded part as a brush, and
    providing the injection point in the area of an end face of a core of the brush or laterally on a base of the stem of the brush.

* * * * *